United States Patent [19]

Sawaki et al.

[11] Patent Number: 5,249,191
[45] Date of Patent: Sep. 28, 1993

[54] WAVEGUIDE TYPE SECOND-HARMONIC GENERATION ELEMENT AND METHOD OF PRODUCING THE SAME

[75] Inventors: Ippei Sawaki; Sunao Kurimura; Michio Miura, all of Kawasaki, Japan

[73] Assignee: Fujitsu Limited, Kawasaki, Japan

[21] Appl. No.: 787,430

[22] Filed: Nov. 4, 1991

[30] Foreign Application Priority Data

Nov. 5, 1990 [JP] Japan .................. 2-299476
Sep. 24, 1991 [JP] Japan .................. 3-243722

[51] Int. Cl.$^5$ ............................... H01S 3/10
[52] U.S. Cl. ........................... 372/22; 372/21; 359/328; 385/122
[58] Field of Search .......... 372/22, 21; 359/328; 385/122

[56] References Cited

U.S. PATENT DOCUMENTS 5,022,729  6/1991  Tamada et al. .............. 359/328
5,036,220  7/1991  Byer et al. .................. 359/328
5,052,770 10/1991  Papuchon .................... 359/328

OTHER PUBLICATIONS

K. Fujita, "Blue/Green Laser using SHG element, Rapid Development Aiming at Applications to Optical Disks", Nekkei Electronics, Aug. 6, 1990 (No. 506), pp. 143-148.
IEEE Photonics Technology Letters, Oct. 1989, No. 10, Webjörn et al. "Blue Light Generated by . . . in a Lithium Niobate Channel Waveguide".
Applied Physics Letters, vol. 56, No. 15 Apr. 1990, Nakamura et al. "Ferroelectric inversion layers . . . treatment of proton-exchanged $LiTaO_3$.".
Applied Physics Letters, vol. 58, No. 24 Aug. 1991, Mizuuchi et al., "Second-harmonic generation of blue light in a $LiTaO_3$ waveguide".
Optics Letters, vol. 58, No. 24, Aug. 1991, Yamamoto et al., "Milliwat-order blue-light generation in a periodically domain-inverted $LiTaO_3$. waveguide".
IEEE Photonics Technology Letters, vol. 3, No. 7, Jul. 1991, Ahlfeldt et al., "Periodic Domain Inversion . . . in Lithium Tantalate Waveguides".
Patent Abstracts of Japan, vol. 16, No. 117, Mar. 1992, Akimoto et al., "Waveguide Type Wavelength Converting Element".

*Primary Examiner*—Léon Scott, Jr.
*Attorney, Agent, or Firm*—Armstrong, Westerman, Hattori, McLeland & Naughton

[57] ABSTRACT

A waveguide type second-harmonic generation element includes a substrate made of $LiTaO_3$, approximately parallel domain inversion regions formed on the substrate and extending in a first direction, where the domain inversion regions have a first depth into the substrate, approximately parallel domain non-inversion regions formed on the substrate and extending in the first direction, where the domain inversion region and the domain non-inversion regions alternately occur on the substrate, and an optical waveguide formed on the substrate and traversing the domain inversion regions and the domain non-inversion regions, where the optical waveguide has a second depth and extends in a second direction which is approximately perpendicular to the first direction.

16 Claims, 13 Drawing Sheets

WAVEGUIDE TYPE SECOND-HARMONIC GENERATION ELEMENT AND METHOD OF PRODUCING THE SAME

BACKGROUND OF THE INVENTION

The present invention generally relates to second-harmonic generation (SHG) elements and methods of producing the same, and more particularly to a waveguide type SHG element which has a high conversion efficiency, a small deviation in the refractive index and a large optical damage threshold.

Recently, lasers and semiconductor lasers in particular are popularly used in apparatuses such as laser printers and laser scanners, and are also used as as a light source for emitting a laser beam which writes and/or reads information on and/or from an optical disk. On the other hand, there are demands to reduce the wavelength of the laser beam, from infrared light to visible light, for example, so as to increase the memory capacity of the optical disk, facilitate the handling of the laser beam and the like. However, although there are developments to reduce the wavelength of the semiconductor laser, it is extremely difficult to reduce the oscillation wavelength to 600 nm or less using the present technology. For this reason, there are demands to realize devices which can obtain coherent light having a short wavelength using the SHG, and particularly to realize a method of producing an periodically domain-inverted optical waveguide for use in such devices.

Conventionally, there is a well known SHG element which passes a laser beam through a nonlinear optical crystal bulk. For example, $LiNbO_3$ which is a ferroelectric crystal is cut into blocks, and both side surfaces of the block are subjected to an optical polishing to form laser beam input and output surfaces. When a laser beam having an angular frequency $\omega$ is input from one side surface of the block, a second harmonic having an angular frequency $2\omega$ which is twice the angular frequency $\omega$ is generated from the other side surface of the block. A conversion efficiency $\eta_{SHG}$ in this case can be described by $P_{2\omega}/P_\omega$, where $P_{2\omega}$ denotes the power of the second harmonic and $P_\omega$ denotes the power of the fundamental wave. As is well known, the second-harmonic power $P_{2\omega}$ has a $\sin^2$ characteristic. The second-harmonic power $P_{2\omega}$ deviates periodically with the $\sin^2$ curve because refractive indexes $n_\omega$ and $n_{2\omega}$ with respect to the respective frequencies differ, where $n_\omega$ denotes the refractive index of the fundamental wave and $n_{2\omega}$ denotes the refractive index of the second harmonic. In other words, the phase of the second harmonic generated at each point do not match due to the difference in the refractive indexes, and the second harmonic deviates due to the phase error with a period corresponding to a phase difference of $2\pi$. In normal crystals, the difference between $n_\omega$ and $n_{2\omega}$ is large due to the wavelength dispersion of the refractive index. Accordingly, a coherent length $l_c$ which corresponds to half the deviation period of the second harmonic is extremely small, and the second-harmonic power $P_{2\omega}$ also becomes extremely small. The quasi phase matching (or index matching) has been proposed to eliminate this problem.

For example, Tada et al., "Introduction to Optical Electronics" 3rd Edition, Maruzen Co., Ltd., 1988, pp. 262-265 proposes a method of obtaining a large second-harmonic power by satisfying the so-called phase matching conditions in which a laser beam is input so that a refractive index $n_e$ of extraordinary light of a second-harmonic light $\lambda_2$ matches a refractive index $n_0$ of ordinary light of a fundamental wave light $\lambda_1$.

FIG. 1 shows a second-harmonic output characteristic for a case where the phases are matched. In FIG. 1, the ordinate indicates the second-harmonic power $P_{2\omega}$ and the abscissa indicates the crystal length 1. A characteristic ③ indicated by broken lines show a case where the refractive indexes of the second-harmonic light $\lambda_2$ and the fundamental wave light $\lambda_1$ are matched and the second-harmonic power $P_{2\omega}$ increases with increasing crystal length 1. However, in the case of the bulk crystal type described above, the phase matching conditions must be satisfied, and furthermore, the light intensity of the fundamental wave must be made large since the obtained crystal does not have a large nonlinear optical coefficient. For these reasons, the method of obtaining the large second-harmonic power has not been reduced to practice for a low-power light source such as the semiconductor laser.

On the other hand, methods of obtaining a large conversion efficiency $\eta_{SHG}$ using an optical waveguide type element with quasi phase-matching have recently been proposed. For example, it is possible to utilize the large nonlinear optical coefficient by matching the phases on the curve of the refractive index $n_e$ of the extraordinary light, so that the large conversion efficiency $\eta_{SHG}$ is obtained. In this case, the refractive indexes of the fundamental wave light and the second-harmonic light differ.

FIG. 2A shows an example of an optical waveguide type SHG element in a perspective view, and FIG. 2B shows a cross section of this SHG element taken along a line X—X' in FIG. 2A.

In FIGS. 2A and 2B, a +Z face of a $LiNbO_3$ substrate 1' is optically polished so that it is possible to obtain a polarization direction and an incident direction such that the largest nonlinear optical coefficient can be obtained. An periodically domain-inverted optical waveguide 4' is formed on top of the substrate 1'. As shown in FIG. 2B, when the ferroelectric upward domains are arranged on the substrate 1' and regions 30' having a predetermined depth with the downward domain inversions are formed at a constant pitch at the part of the optical waveguide 4' with a period $\Lambda$, for example, it is possible to obtain the periodically domain-inverted optical waveguide 4' in which the downward domain inversion regions 30' are arranged at the constant pitch.

It is known from Armstrong et al., "Interactions between Light Waves in a Nonlinear Dielectric", Physical Review, Vol. 127, 1962, pp. 1918-1939 that a large second-harmonic power can be obtained when a laser beam having an angular frequency $\omega$ is input to the periodically domain-inverted optical waveguide 4' from the left in FIG. 2B so as to satisfy the quasi phase matching conditions and output to the right.

In FIG. 1, a characteristic ① shows an ideal second-harmonic output characteristic for the case where the phases are matched. In this case, the second-harmonic power $P_{2\omega}$ increases with increasing crystal length 1, and in addition, the conversion efficiency is greatly improved compared to the bulk crystal type because a large nonlinear optical coefficient is used.

In order to make the periodically domain-inverted optical waveguide 4' described above, it is necessary to partially form the domain inversion regions, such as the downward domain inversion regions 30' shown in FIG. 2B. There basically are two known methods of forming such domain inversion regions.

According to a first method, a suitable mask is provided on the substrate 1' and the substrate 1' is then heated to a high temperature. In this case, the Li at the exposed surface parts of the substrate 1' diffuses to the outside and the domain at these parts becomes inverted. However, the depth of the domain inversion region which is formed is only on the order of 1 μm. In addition, there is a problem in that the refractive index varies at these parts, thereby making the optical waveguide unsuited for practical use.

On the other hand, according to a second method, Ti is deposited on parts of the substrate 1' where the domain inversion regions are to be formed, and the substrate 1' is then subjected to a thermal process. In this case, the domain at these parts becomes inverted, and the depth of the domain inversion region which is formed can be made to several μm.

Next, a description will be given of an example of a conventional method of forming the partial domain inversion regions, by referring to FIGS. 3A through 3E.

In FIG. 3A, the +Z face of a single domain ferroelectric crystal such as $LiNbO_3$ is optically polished to form a substrate 1'.

In FIG. 3B, a Ti layer 20 is formed to a thickness of 300 nm on the substrate 1, by a vacuum evaporation.

In FIG. 3C, a photoetching process is carried out so that the Ti layer part where the domain inversion regions 30' are to be formed remains, thereby forming a Ti layer pattern 20'.

In FIG. 3D, the substrate 1' is subjected to a thermal process at 1000° C. to diffuse the Ti. As a result, Ti diffusion regions 20'' are formed, and the domain inversion occurs at the surface portion of the substrate 1' at the Ti diffusion regions 20''.

In FIG. 3E, an appropriate fluid is used to clean the surface of the substrate 1' so as to remove any residual Ti which may still remain at the surface part of the substrate 1'. As a result, the partial domain inversion regions 30' which form the domain inversion regions of the periodically domain-inverted optical waveguide are formed, and the waveguide type SHG element can be produced by forming an optical waveguide on partial domain inversion regions 30' of the substrate 1'.

However, the partial domain inversion regions 30' which are formed by the above described method includes Ti. For this reason, as is well known in the art, the so-called optical damage threshold decreases when a laser beam is passed through the partial domain inversion regions 30', and furthermore, the refractive index changes. As a result, the second-harmonic power of the periodically domain-inverted optical waveguide does not increase beyond a certain point as indicated by a dotted line ②  in FIG. 1, and the loss caused by scattering light due to the change in the refractive index increases. In addition, there are problems in that the method described above cannot be applied to crystals having a relatively low Curie point, such as $LiTaO_3$ and potassium titanium phosphate (KTP).

SUMMARY OF THE INVENTION

Accordingly, it is a general object of the present invention to provide a novel and useful waveguide type SHG element and a method of producing the same, in which the problems described above are eliminated.

Another and more specific object of the present invention is to provide a waveguide type second-harmonic generation element comprising a substrate made of $LiTaO_3$ and having a top surface, a plurality of approximately parallel domain inversion regions formed on the top surface of the substrate and extending in a first direction, where the domain inversion regions have a first depth into the substrate, a plurality of approximately parallel domain non-inversion regions formed on the top surface of the substrate and extending in the first direction, where the domain inversion region and the domain non-inversion regions alternately occur on the substrate, and an optical waveguide formed on the top surface of the substrate and traversing the domain inversion regions and the domain non-inversion regions, where the optical waveguide has a second depth and extends in a second direction which is approximately perpendicular to the first direction. According to the waveguide type second-harmonic generation element of the present invention, it is possible to obtain a high optical damage threshold and make the second-harmonic generation with a high conversion efficiency.

Still another object of the present invention is to provide a method of producing a waveguide type second-harmonic generation element, comprising the steps of (a) forming periodic proton ($H^+$) exchange blocking layers on a top surface of a substrate which is made of $LiTaO_3$, where the proton ($H^+$) exchange blocking layers are approximately parallel and extending in a first direction which is approximately perpendicular to a second direction in which the proton ($H^+$) exchange blocking layers are periodically arranged, (b) forming proton exchange layers on the top surface of the substrate not covered by the proton ($H^+$) exchange blocking layers, (c) forming periodic domain inversion regions by heating the substrate to a predetermined temperature immediately below a Curie point and inverting domain of the proton ($H^+$) exchange layers, (d) diffusing the proton ($H^+$) by subjecting the substrate to an annealing process, and (e) forming an optical waveguide on the top surface of the substrate so as to traverse the domain inversion regions, where the optical waveguide extends in the second direction. According to the method of the present invention, the proton exchange which is used for the domain inversion is carried out at a temperature which is relatively low compared to the process temperature at which the Ti diffusion is conventionally made to form the domain inversion of $LiBnO_3$. For this reason, the method of the present invention may be applied to crystals having a relatively low Curie point, such as $LiTaO_3$, and it is possible to produce a high-performance and high-quality waveguide type second-harmonic generation element.

Other objects and further features of the present invention will be apparent from the following detailed description when read in conjunction with the accompanying drawings.

DESCRIPTION OF THE PREFERRED EMBODIMENTS

A description will be given of a first embodiment of a method of producing a waveguide type SHG element according to the present invention, by referring to FIGS. 4A through 4J. FIGS. 4A, 4C, 4D, 4E, 4F, 4G and 4I are cross sectional views, and FIGS. 4B, 4H and 4J are perspective views.

Figure 4A:
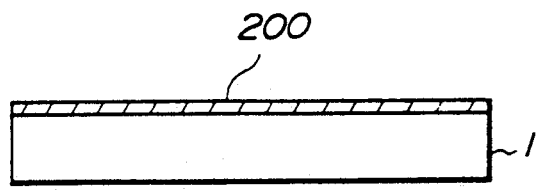
FIGS. 4A through 4J are diagrams for explaining a first embodiment of a method of producing a waveguide type SHG element according to the present invention, for producing a first embodiment of the waveguide type SHG element according to the present invention.

In FIG. 4A, a substrate 1 is cut from a ferroelectric single crystal and is made of a single domain $LiTaO_3$. For example, the substrate 1 has a thickness of 0.5 mm, a width of 10 mm and a length of 15 mm. The -Z face of the substrate 1 is optically polished so that a largest nonlinear optical coefficient is obtained. A proton ($H^+$) exchange blocking layer 200 is formed on this substrate 1. For example, the proton ($H^+$) exchange blocking layer 200 is made up of a Ta layer which is formed on the substrate 1 by an electron beam evaporation and has a thickness of 50 nm.

Figure 4B:
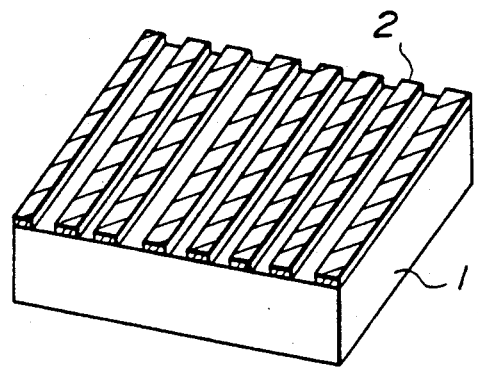

In FIG. 4B, periodic proton ($H^+$) exchange blocking layers 2 are formed from the proton ($H^+$) exchange blocking layer 200 using a normal photolithography technique. For example, the periodic proton ($H^+$) exchange blocking layers 2 are formed by forming a resist pattern on the proton ($H^+$) exchange blocking layer 200 as a mask and making a reactive ion etching (RIE) using a gas mixture of $CF_4+O_2$ to remove portions of the proton ($H^+$) exchange blocking layer 200 not covered by the mask. For example, the periodic proton ($H^+$) exchange blocking layers 2 are formed at a constant pitch of approximately 6 $\mu m$ which satisfies the quasi-phase-matching condition for a fundamental wavelength of 1.06 $\mu m$, and each periodic proton ($H^+$) exchange blocking layer 2 has a width of 3 $\mu m$.

Figure 4C:
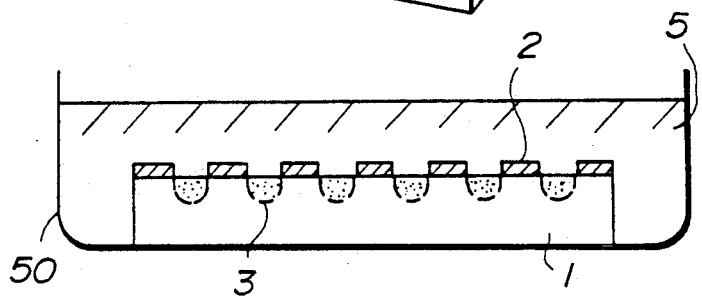

In FIG. 4C, the substrate structure shown in FIG. 4B is submerged into a proton ($H^+$) exchange fluid 5 which is contained in a container 50. For example, the proton ($H^+$) exchange fluid 5 is made up of pyrophosphoric acid having a temperature of 260° C., and the proton ($H^+$) exchange is carried out for approximately 30 minutes to form proton ($H^+$) exchange layers 3.

Figure 4D:
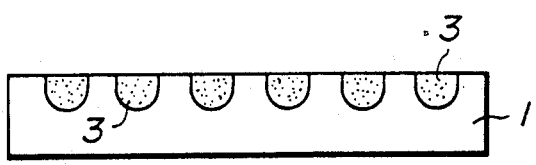

In FIG. 4D, the substrate structure shown in FIG. 4C is processed in a predetermined fluid such as a $NaOH+H_2O_2$ fluid mixture, so as to dissolve and remove the proton ($H^+$) exchange blocking layers 2, that is, the Ta layer pattern.

Figure 4E:
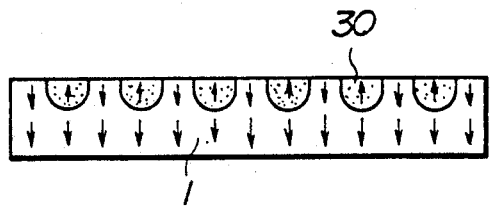

In FIG. 4E, the substrate structure shown in FIG. 4D is heated to a temperature immediately below the Curie point within a predetermined time, so as to invert the domains of the proton ($H^+$) exchange layers 3 and form a domain inversion region 30 in each region of the proton ($H^+$) exchange layer 3. The domain is indicated by an arrow in FIG. 4E. For example, the temperature immediately below the Curie point is 590° to 595° C., and the predetermined time is 15 minutes. The depth of the domain inversion region 30 can be controlled by adjusting the maximum heating temperature and the temperature raising speed.

When the proton ($H^+$) exchange is carried out on the surface of certain kinds of ferroelectric single crystals such as $LiTaO_3$, the Curie point at the portion where the proton ($H^+$) concentration becomes high decreases by several °C. to approximately 10° C. Hence, as is known from Ultrasonic Waves Technical Research Report of the Electronic Information Communication Society, US87-37, 1987, the domain at this portion can be inverted by carrying out a thermal process at a temperature below the Curie point after carrying out the above proton ($H^+$) exchange. The present invention effectively uses this phenomenon.

Figure 4F:
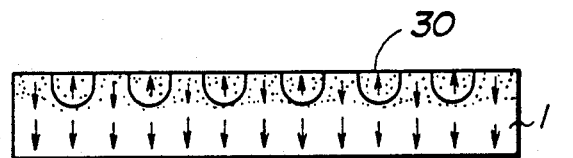

In FIG. 4F, the substrate structure shown in FIG. 4E is subjected to an annealing process for approximately 10 hours at a certain temperature which is approximately 100° C. lower than the Curie point, for example, so as to diffuse the proton ($H^+$). For example, this certain temperature is approximately 500° C. for the $LiTaO_3$ substrate 1. As a result, the proton ($H^+$) concentration at the part where the optical waveguide is to be formed becomes uniform, that is, the refractive index distribution of this part becomes uniform. This annealing process may be omitted if the proton ($H^+$) concentration is sufficiently uniform after carrying out the domain inversion process described above in conjunction with FIG. 4E.

Because the proton ($H^+$) concentration is approximately uniform and the refractive index distribution is uniform, it is possible to positively prevent scattering of light due to a deviation in the refractive index. Furthermore, since the proton ($H^+$) exchange is used to form the optical waveguide 4 and no processes such as Ti diffusion and diffusion of Li outside the crystal are carried out, the optical damage threshold can be made large and the conversion efficiency of the second-harmonic generation can be maintained high. In addition, the proton exchange which is used for the domain inversion to form the domain inversion regions 30 is carried out at a temperature which is relatively low compared to the process temperature at which the Ti diffusion is conventionally made to form the domain inversion of LiBnO$_3$. For this reason, the present invention may be applied to crystals having a relatively low Curie point, such as LiTaO$_3$, and it is possible to produce a high-performance and high-quality waveguide type second-harmonic generation element.

Figure 4G:
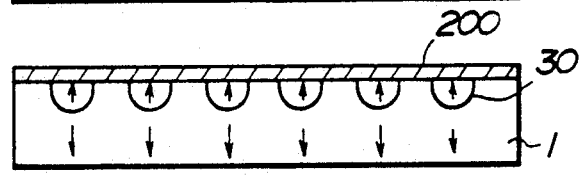
Figure 4H:
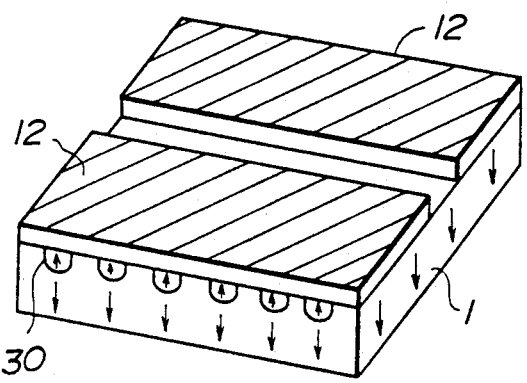

In FIG. 4G, a proton (H+) exchange blocking layer 200 is formed on the substrate structure shown in FIG. 4E or 4F. For example, the proton (H+) exchange blocking layer 200 is made up of a Ta layer which is formed on the substrate 1 by an electron beam evaporation and has a thickness of 50 nm.

In FIG. 4H, a process similar to that described above in conjunction with FIG. 4B is carried out to form a proton (H+) exchange blocking layer 12 which traverses the periodic domain inversion regions 30. This proton (H+) exchange blocking layer 12 has a window which has the form of a slit for forming an optical waveguide 4 using the proton (H+) exchange. For example, the width of the slit in the proton (H+) exchange blocking layer 12 is approximately 3 μm.

Figure 4I:
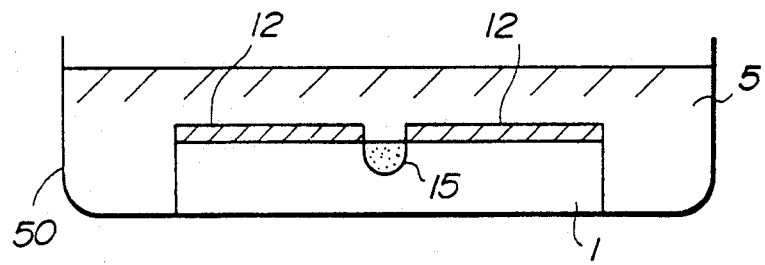
Figure 4J:
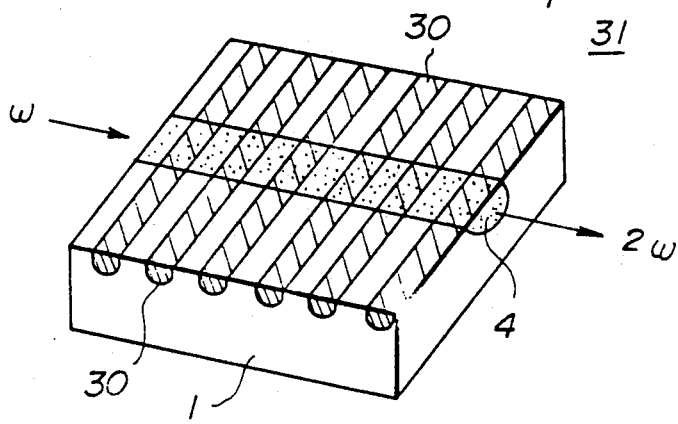

In FIG. 4I, the substrate structure shown in FIG. 4H is subjected to a process similar to that described above in conjunction with FIG. 4C, so as to form a proton (H+) exchange layer 15 which forms the optical waveguide 4. This proton (H+) exchange layer 15 has a refractive index which is approximately 0.02 higher than the surrounding parts.

In FIG. 4J, the proton (H+) exchange blocking layer 12 (for example, the Ta layer pattern) remaining on the substrate structure shown in FIG. 4I is dissolved and removed by a process similar to that described above in conjunction with FIG. 4G. As a result, a waveguide type SHG element 31 having the periodic domain inversion regions is formed.

It was found that a first embodiment of the waveguide type SHG element according to the present invention, that is, the waveguide type SHG element 31, is stronger against the optical damage, has a small refractive index deviation and a high conversion efficiency when compared to the conventional SHG type element which is produced by the conventional method.

Next, a description will be given of a second embodiment of the method of producing the waveguide type SHG element according to the present invention, by referring to FIGS. 5A through 5I, 6 and 7. FIGS. 5A, 5C, 5D, 5E, 5F, 5G and 5I are cross sectional views, and FIGS. 5B and 5H are perspective views.

Figure 5A:
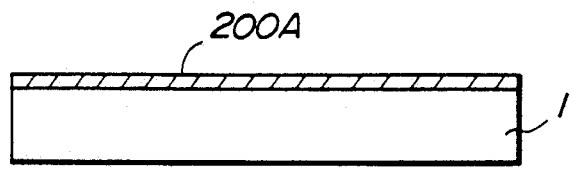
FIGS. 5A through 5I are diagrams for explaining a second embodiment of the method of producing the waveguide type SHG element according to the present invention, for producing a second embodiment of the waveguide type SHG element according to the present invention.

In FIG. 5A, a substrate 1 is cut from a ferroelectric single crystal and is made of a single domain LiTaO$_3$. For example, the substrate 1 has a thickness of 0.5 mm, a width of 10 mm and a length of 15 mm. The -Z face of the substrate 1 is optically polished so that a largest nonlinear optical coefficient is obtained. A proton (H+) exchange blocking layer 200A is formed on this substrate 1. For example, the proton (H+) exchange blocking layer 200A is made up of a Ta layer which is formed on the substrate 1 by an electron beam evaporation and has a thickness of 50 nm.

Figure 5B:
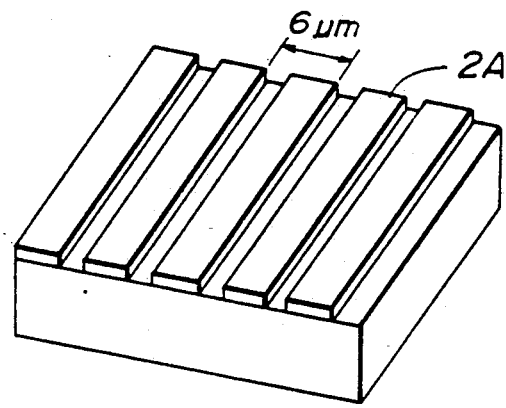

In FIG. 5B, periodic proton (H+) exchange blocking layers 2A are formed from the proton (H+) exchange blocking layer 200A using a normal photolithography technique. For example, the periodic proton (H+) exchange blocking layers 2A are formed by forming a resist pattern on the proton (H+) exchange blocking layer 200A as a mask and making an RIE using a gas mixture of CF$_4$+O$_2$ to remove portions of the proton (H+) exchange blocking layer 200A not covered by the mask. For example, the periodic proton (H+) exchange blocking layers 2A are formed at a constant pitch of approximately 6 μm, and an aperture ratio of the periodic proton (H+) exchange blocking layers 2A is 0.3.

Figure 5C:
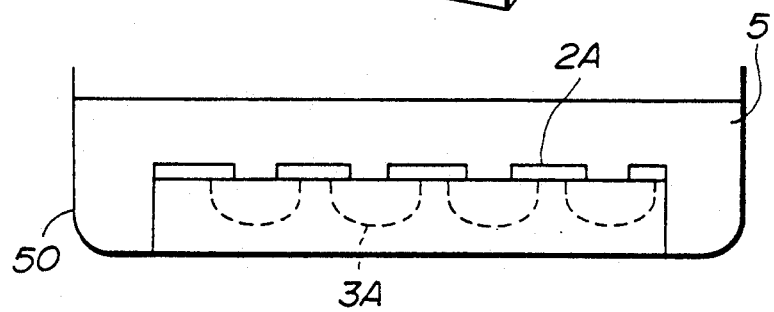

In FIG. 5C, the substrate structure shown in FIG. 5B is submerged into a proton (H+) exchange fluid 5 which is contained in a container 50. For example, the proton (H+) exchange fluid 5 is made up of pyrophosphoric acid having a temperature of 260° C., and the proton (H+) exchange is carried out for approximately 30 minutes to form proton (H+) exchange layers 3A.

Figure 5D:
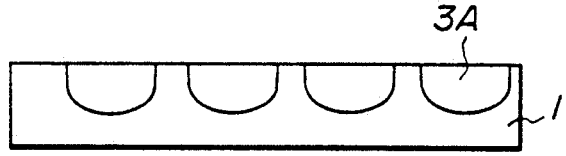

In FIG. 5D, the substrate structure shown in FIG. 5C is processed in a predetermined fluid such as a NaOH+H$_2$O$_2$ fluid mixture, so as to dissolve and remove the proton (H+) exchange blocking layers 2A, that is, the Ta layer pattern.

Figure 5E:
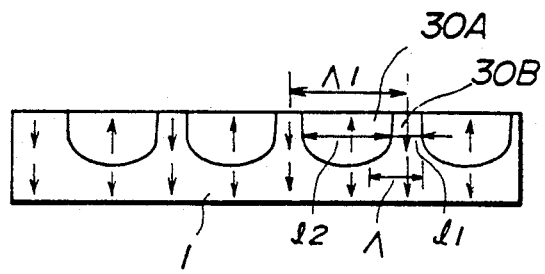

In FIG. 5E, the substrate structure shown in FIG. 5D is heated to a temperature immediately below the Curie point for a predetermined time, so as to invert the domains of the proton (H+) exchange layers 3A and form a domain inversion region 30A in each region of the proton (H+) exchange layer 3A. The domain is indicated by an arrow in FIG. 5E. For example, the temperature immediately below the Curie point is 590° C., and the predetermined time is 1 hour. The depth of the domain inversion region 30A can be controlled by adjusting the maximum heating temperature and the temperature raising speed. Such a control was extremely difficult to carry out by the conventional Ti diffusion.

In this embodiment, a length $l_1$ of a domain non-inversion region 30B corresponds to the coherent length, and is 1.5 μm for a fundamental wavelength of 0.85 μm. On the other hand, a length $l_2$ of the domain inversion region 30A is 4.5 μm.

A minimum period $\Lambda_{min}$ of the domain inversion required for the quasi phase matching may be described by the following formula, where $\beta(2\omega)$ denotes the propagation constant of the second harmonic and $\beta(\omega)$ denotes the propagation constant of the fundamental wave. The minimum period $\Lambda_{min}$ is twice the coherent length $l_c$.

$$\beta(2\omega) - 2\beta(\omega) = 2\pi/\Lambda_{min}$$

In this embodiment, a wavelength $\lambda_F$ of the fundamental wave is 850 nm, and a wavelength $\lambda_{SH}$ of the second harmonic is 425 nm. Hence, in this case, the minimum period $\Lambda_{min}$ of the domain inversion required for the quasi phase matching is 3.0 μm.

Figure 5F:
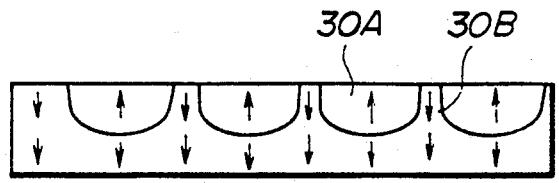

In FIG. 5F, the substrate structure shown in FIG. 5E is subjected to an annealing process for approximately 10 hours at a certain temperature which is approximately 100° C. lower than the Curie point, for example, so as to diffuse the proton (H+). For example, this certain temperature is approximately 500° C. for the LiTaO$_3$ substrate 1. As a result, the proton (H+) concentration at the part where the optical waveguide is to be formed becomes uniform, that is, the refractive index distribution of this part becomes uniform. This annealing process may be omitted if the proton (H+) concentration is sufficiently uniform after carrying out the domain inversion process described above in conjunction with FIG. 5E.

Figure 5G:
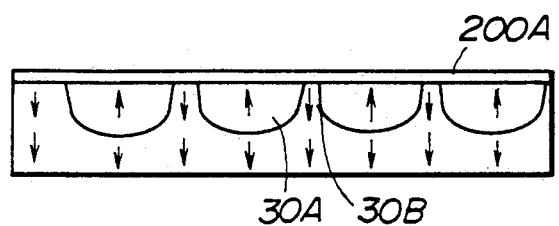
Figure 5H:
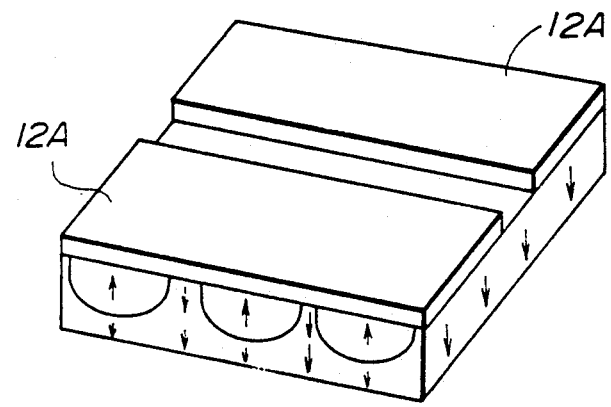

In FIG. 5G, a proton (H+) exchange blocking layer 200A is formed on the substrate structure shown in FIG. 5E or 5F. For example, the proton (H+) exchange blocking layer 200A is made up of a Ta layer which is formed on the substrate 1 by an electron beam evaporation and has a thickness of 50 nm.

In FIG. 5H, a process similar to that described above in conjunction with FIG. 5B is carried out to form a proton (H+) exchange blocking layer 12A which traverses the periodic domain inversion regions 30A. This proton (H+) exchange blocking layer 12A has a window which has the form of a slit for forming an optical waveguide 4A using the proton (H+) exchange. For example, the width of the slit in the proton (H+) exchange blocking layer 12A is approximately 2 μm.

Figure 5I:
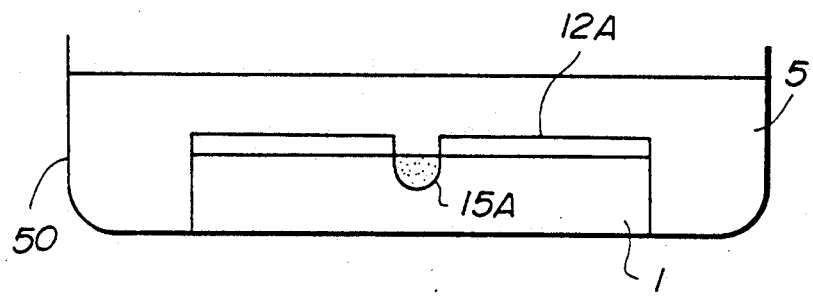

In FIG. 5I, the substrate structure shown in FIG. 5H is subjected to a process similar to that described above in conjunction with FIG. 5C, so as to form a proton (H+) exchange layer 15A which forms the optical waveguide 4A. This proton (H+) exchange layer 15A has a refractive index which is approximately 0.02 higher than the surrounding parts. For example, the substrate structure shown in FIG. 5H is submerged into a proton (H+) exchange fluid such as pyrophosphoric acid having a temperature of 260° C., and the proton (H+) exchange is carried out for approximately 60 minutes to form proton (H+) exchange layer 15A.

Figure 6:
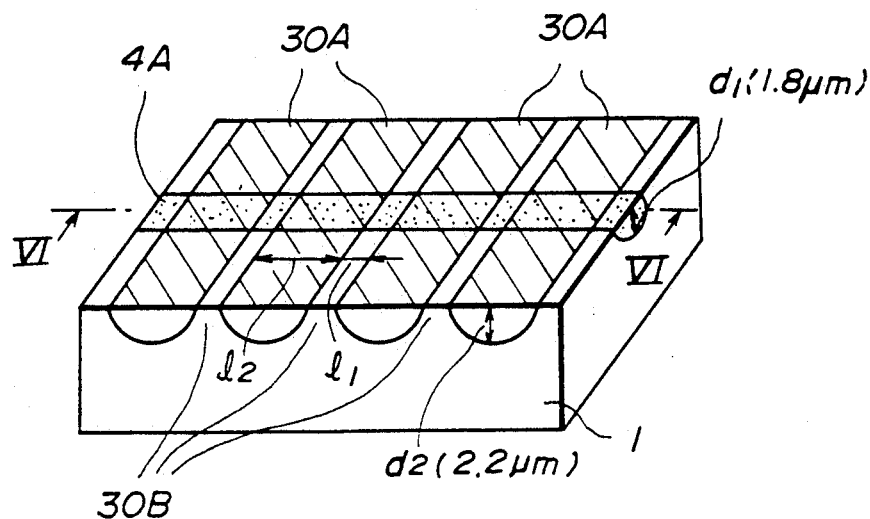
FIG. 6 is a perspective view showing the second embodiment of the waveguide type SHG element according to the present invention.
Figure 7:
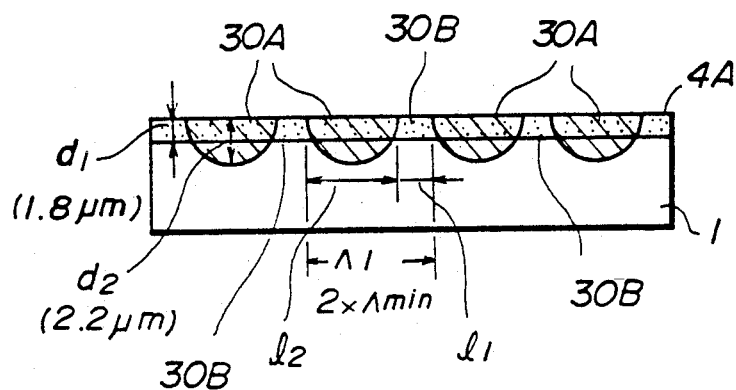
FIG. 7 is a cross sectional view showing the second embodiment of the waveguide type SHG element taken along a line VI—VI in FIG. 6.

Then, the substrate structure shown in FIG. 5I is subjected to an annealing process at 390° C. for 20 minutes, for example, so as to form the optical waveguide 4A which has a depth $d_1$ of approximately 1.8 μm as shown in FIGS. 6 and 7.

The proton (H+) exchange blocking layer 12A (for example, the Ta layer pattern) remaining on the substrate structure shown in FIG. 5I is dissolved and removed by a process similar to that described above in conjunction with FIG. 5G. As a result, a waveguide type SHG element 40 having the periodic domain inversion regions is formed as shown in FIGS. 6 and 7. FIG. 6 shows the waveguide type SHG element 40 in a perspective view, and FIG. 7 shows the waveguide type SHG element 40 in a cross section taken along a line VI—VI in FIG. 6.

It was found that a second embodiment of the waveguide type SHG element according to the present invention, that is, the waveguide type SHG element 40, is stronger against the optical damage, has a small refractive index deviation and a high conversion efficiency when compared to the conventional SHG type element which is produced by the conventional method.

Next, a description will be given of the construction and the characteristics of the waveguide type SHG element 40 shown in FIGS. 6 and 7.

As shown in FIGS. 6 and 7, the domain inversion regions 30A have an approximately semi-circular cross section because the domain inversion regions 30A are formed by the proton (H+) exchange as described above. The maximum depth $d_2$ of the domain inversion region 30A is approximately 2.2 μm, and this maximum depth $d_2$ is larger than the maximum depth $d_1$ of the optical waveguide 4A which is approximately 1.8 μm. At the part of the waveguide type SHG element 40 corresponding to the optical waveguide 4A, the length $l_1$ of the domain non-inversion region 30B is 1.5 μm and the length $l_2$ of the domain inversion region 30A is 4.5 μm. Hence, a minimum period $\Lambda_{min}$ required for the quasi phase matching is 3.0 μm in this case. The domain inversion period $\Lambda$ is thus two times the minimum period $\Lambda_{min}$. The ratio of the lengths $l_2$ and $l_1$ is 3:1. As a general expression, the ratio of the lengths $l_2$ and $l_1$ may be given by 2n-1:1 when the domain inversion period $\Lambda$ is n times the minimum period $\Lambda_{min}$.

Figure 1:
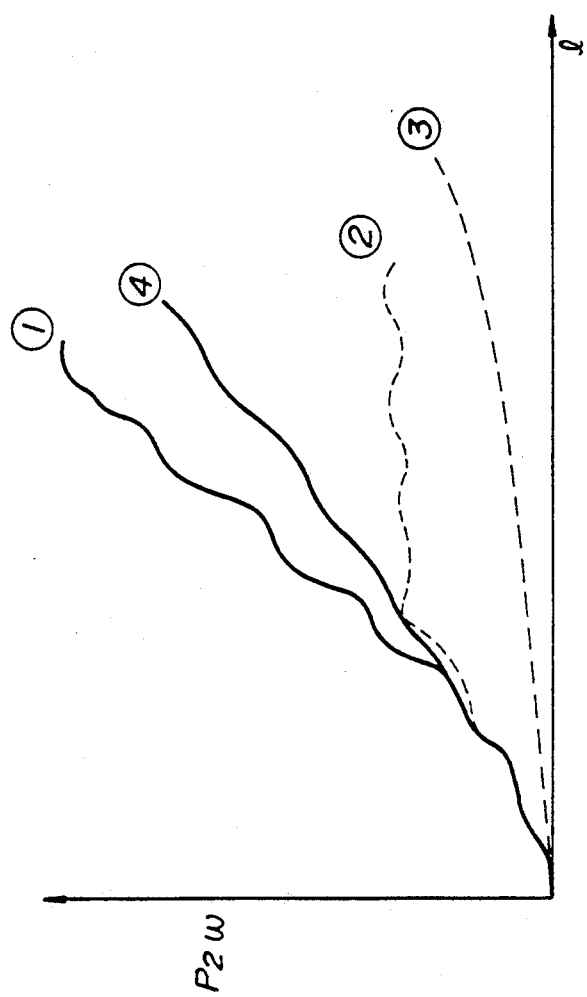
FIG. 1 shows second-harmonic output characteristics of optical waveguides.
Figure 2A:
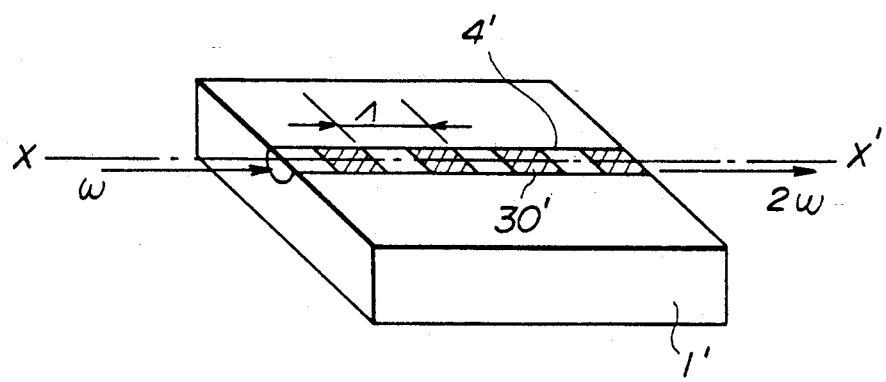
FIGS. 2A and 2B respectively are a perspective view and a cross sectional view showing an example of a conventional optical waveguide type SHG element.
Figure 2B:
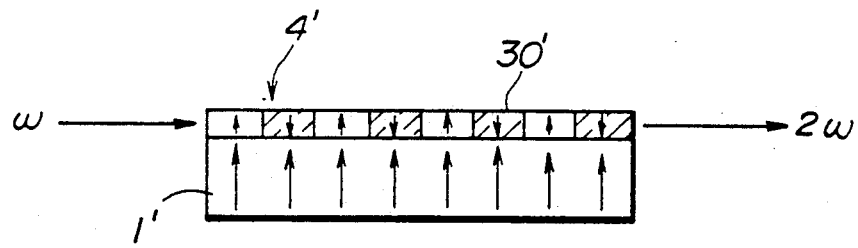
Figure 3A:
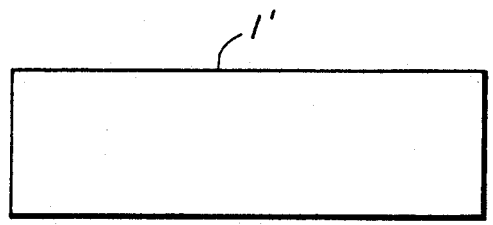
FIGS. 3A through 3E are plan views for explaining a conventional method of forming partial domain inversion regions.
Figure 3B:
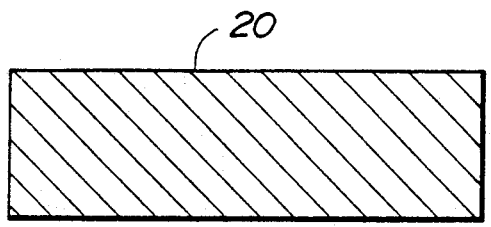
Figure 3C:
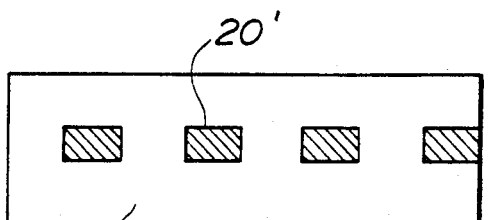
Figure 3D:
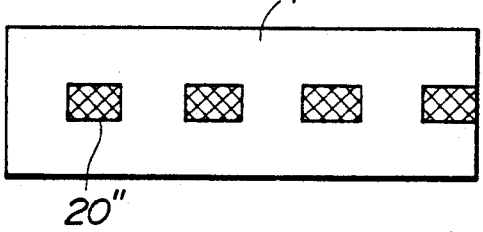
Figure 3E:
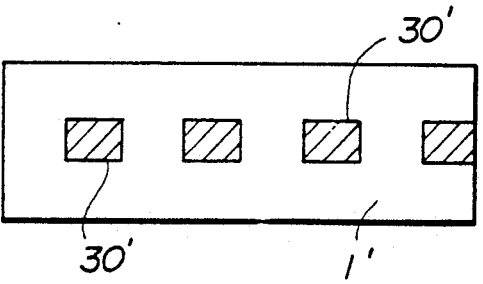

Accordingly, the fundamental wave propagating through the optical waveguide 4A always propagates through the domain inversion regions 30A which are provided with the ratio of the lengths $l_2$ and $l_1$ set to 2n-1:1 (3:1 in this embodiment). As a result, the quasi phase matching is carried out satisfactorily in this embodiment, and the second-harmonic power $P_{2\omega}$ is generated efficiently as indicated by a characteristic ④ in FIG. 1.

Figure 9:
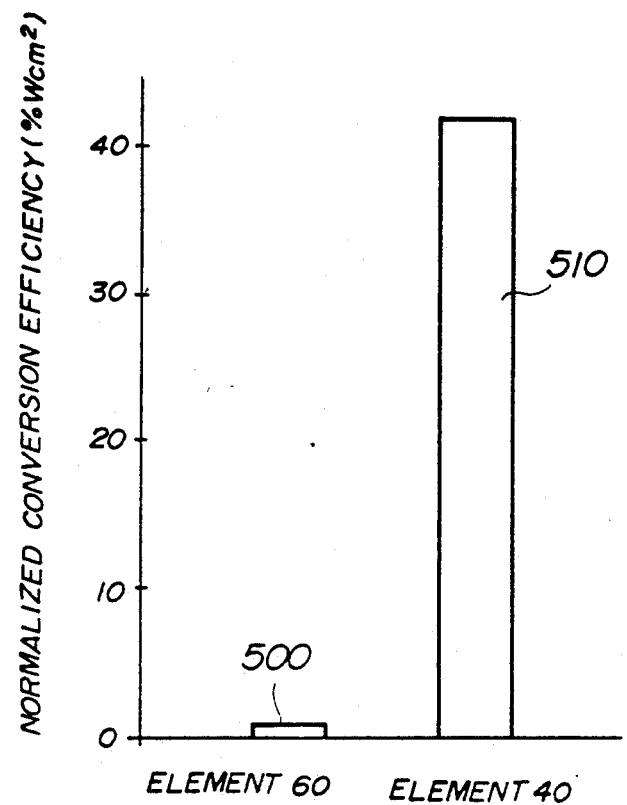
FIG. 9 shows a normalized conversion efficiency of the waveguide type SHG element shown in FIG. 8 in comparison with a normalized conversion efficiency of the second embodiment of the waveguide type SHG element.
Figure 8:
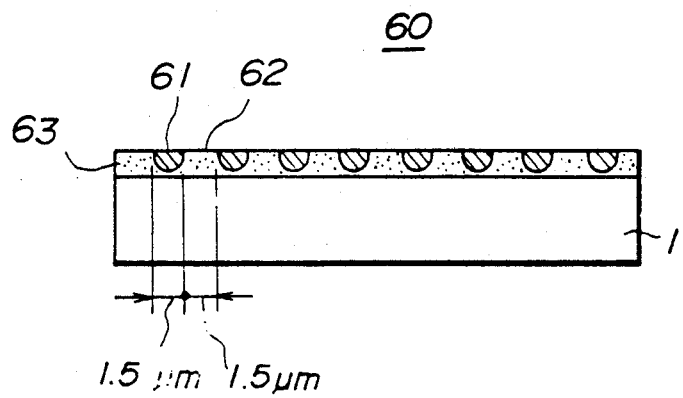
FIG. 8 is a cross sectional view showing a waveguide type SHG element in which the domain inversion period is a minimum period required for the quasi phase matching.

FIG. 8 shows a waveguide type SHG element 60 in which the length of a domain inversion region 61 and the length of a domain non-inversion region 62 are both 1.5 μm and the domain inversion period is the minimum period required for the quasi phase matching. In this case, the domain inversion region 61 is provided only in the vicinity of the surface portion of an optical waveguide 63 and does not reach the deep portion of the optical waveguide 63. For this reason, a part of the fundamental wave propagating through the optical waveguide 63 propagates outside the domain inversion region 61, and the quasi phase matching does not occur as expected. As a result, a normalized conversion efficiency of the waveguide type SHG element 60 becomes as indicated by a histogram 500 shown in FIG. 9. As shown in FIG. 9, the histogram 500 is low.

But in the case of the waveguide type SHG element 40 shown in FIGS. 6 and 7, the quasi phase matching is carried out satisfactorily and efficiently as described above. Accordingly, the standard conversion efficiency becomes as indicated by a histogram 510 shown in FIG. 9. This histogram 510 is approximately 40 %/Wcm$^2$ which is high compared to the histogram 500.

Next, a description will be given of a third embodiment of the waveguide type SHG element according to the present invention, by referring to FIG. 10. In this embodiment, n=3.

Figure 10:
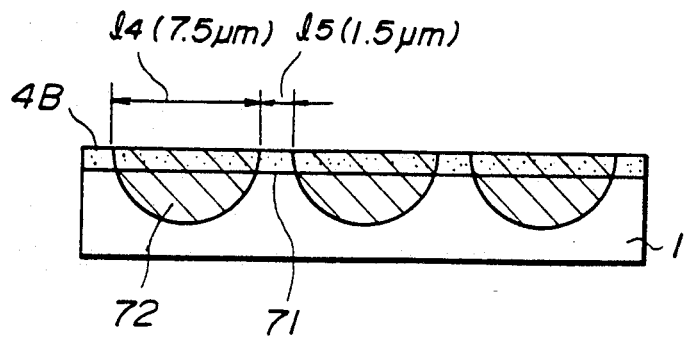
FIG. 10 is a cross sectional view showing a third embodiment of the waveguide type SHG element according to the present invention.

In a waveguide type SHG element 70 shown in FIG. 10, a length $l_3$ of a domain non-inversion region 71 corresponds to the coherent length and is 1.5 μm. A domain inversion region 72 is formed by a proton (H+) exchange, and a length $l_4$ of the domain inversion region 72 is 7.5 μm. The ratio of the lengths $l_4$ and $l_3$ is 2n-1:1 = 5:1. This waveguide type SHG element 70 has a normalized conversion efficiency similar to the histogram 510 shown in FIG. 9.

Figure 11:
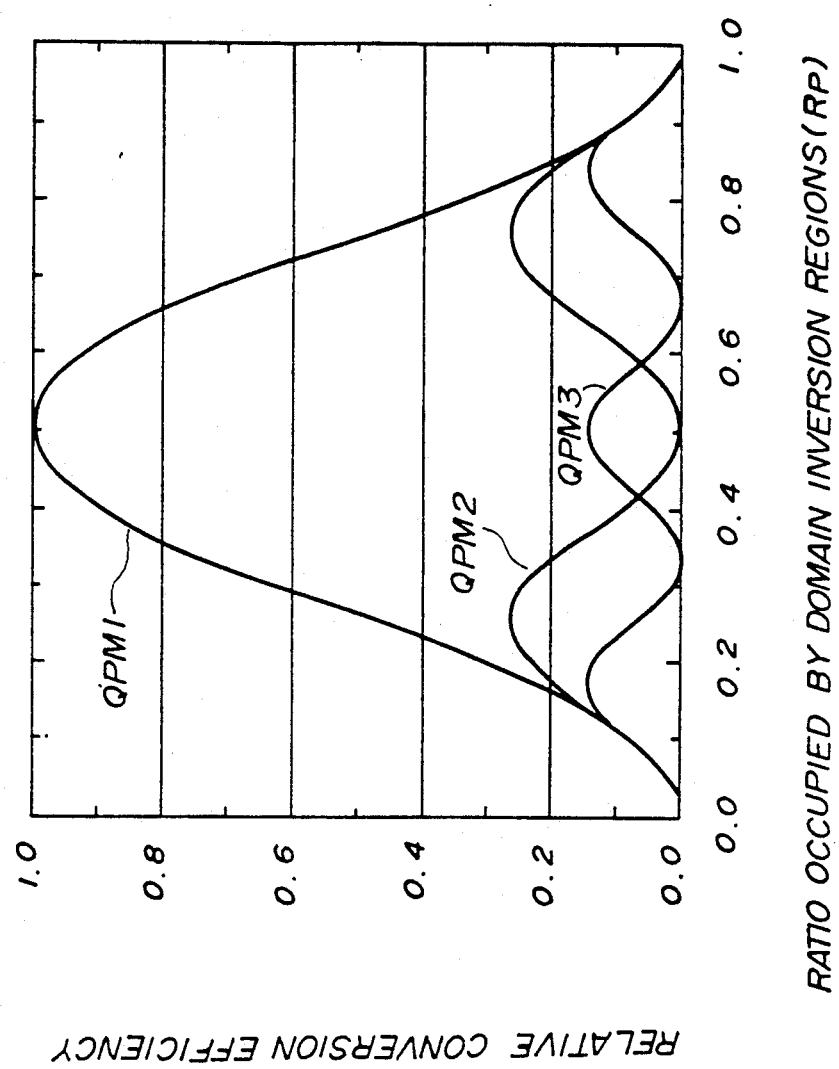
FIG. 11 is a diagram for explaining a relationship between a relative conversion efficiency and a ratio of parts occupied by domain inversion regions.

Next, a description will be given of the relative conversion efficiency with respect to the domain inversion ratio, that is, a ratio $R_p$ occupied by the domain inversion regions, by referring to FIG. 11. In FIG. 11, QPM1, QPM2 and QPM3 respectively indicate the relative conversion efficiencies of first, second and third order quasi phase matchings. A maximum relative conversion efficiency is obtained at $R_p=0.5$ for the first order quasi phase matching QPM1. A maximum relative conversion efficiency is obtained at $R_p=0.25$ and 0.75 for the second order quasi phase matching QPM2. In addition, a maximum relative conversion efficiency is obtained at $R_p=0.17$ (or 1/6), 0.5, and 0.83 (or 5/6) for the third order quasi phase matching QPM3. The relative conversion efficiencies shown in FIG. 11 are calculated for a case where the domain inversion regions have an ideal shape, that is, for an ideal case where the domain inversion regions are uniformly inverted to a sufficient depth which is deeper than the depth of the optical waveguide. Hence, in this case, the waveguide type SHG element with the first order quasi phase matching shows the best relative conversion efficiency.

However, in actual practice, the domain inversion regions have the semi-circular cross section as described above in conjunction with the embodiments. For this reason, the depth of the domain inversion regions having the small period becomes small in the waveguide type SHG element with the first order quasi phase matching, and the relative conversion efficiency becomes poor because of the poor mutual effects of the optical waveguide and the domain inversion regions.

Figure 12:
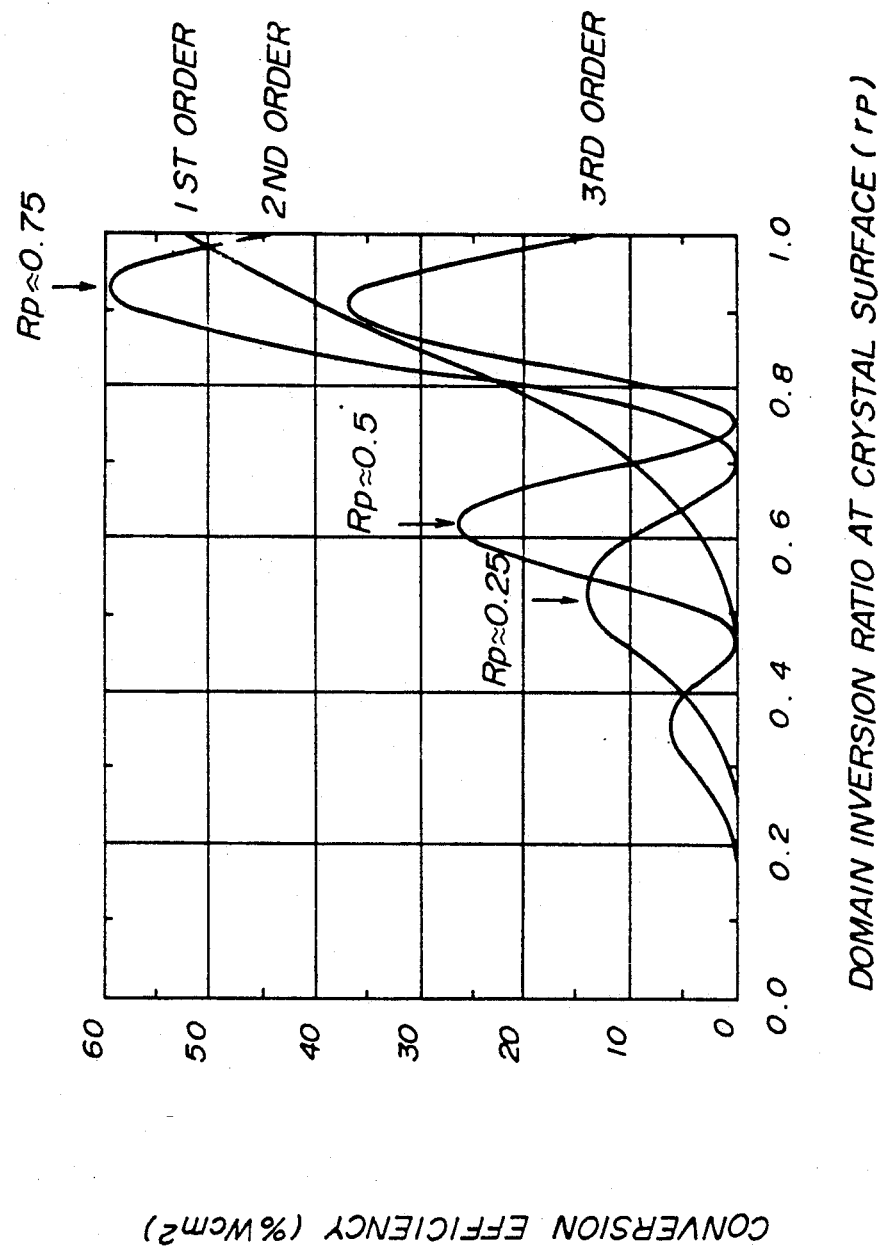
FIG. 12 is a diagram for explaining a conversion efficiency relative to a domain inversion ratio on a crystal surface.

FIG. 12 shows the conversion efficiency of the waveguide type SHG element for a case where the optical waveguide has a depth of 3 μm and the shape of the domain inversion regions are taken into consideration for the calculation. The domain inversion period for the first, second and third order quasi phase matchings respectively are 3.5 μm or less, 7 μm or less and 10.5 μm or less. In addition, the domain inversion ratio $r_p = r_l/\Lambda$, where $r_l$ denotes the inversion length at the crystal surface and $\Lambda$ denotes the domain inversion period. In this case, it may be seen from FIG. 12 that the waveguide type SHG element with the second order quasi phase matching shows the best conversion efficiency. But in this case, the length of the domain inversion region decreases depending on the distance from the crystal surface, and the effective domain inversion ratio is smaller than the inversion ratio at the crystal surface. Hence, $R_p = 0.75$ is obtained when the inversion ratio at the crystal surface is 0.9 to 0.95.

The calculation result described above changes if the depth of the optical waveguide changes. If the optical waveguide is less than 2 μm and shallow, the conversion efficiency of the waveguide type SHG element with the first order quasi phase matching may become better than that of the waveguide type SHG element with the second order quasi phase matching. However, in the case of the waveguide type SHG element with the first order quasi phase matching, the period of the domain inversion regions is less than 3.5 μm which is quite small. Consequently, it is difficult to form the patterns of the domain inversion regions with a satisfactory reproducibility, and the waveguide type SHG element with the second order quasi phase matching is better suited for practical use.

In the process described above in conjunction with FIG. 4E, the substrate structure shown in FIG. 4D is heated to a temperature immediately below the Curie point within a predetermined time, so as to invert the domains of the proton (H+) exchange layers 3 and form a domain inversion region 30 in each region of the proton (H+) exchange layer 3. In the first embodiment of the method, the temperature immediately below the Curie point is 590° to 595° C., and the predetermined time is 15 minutes. The depth of the domain inversion region 30 is controlled by adjusting the maximum heating temperature and the temperature raising speed.

Figure 13:
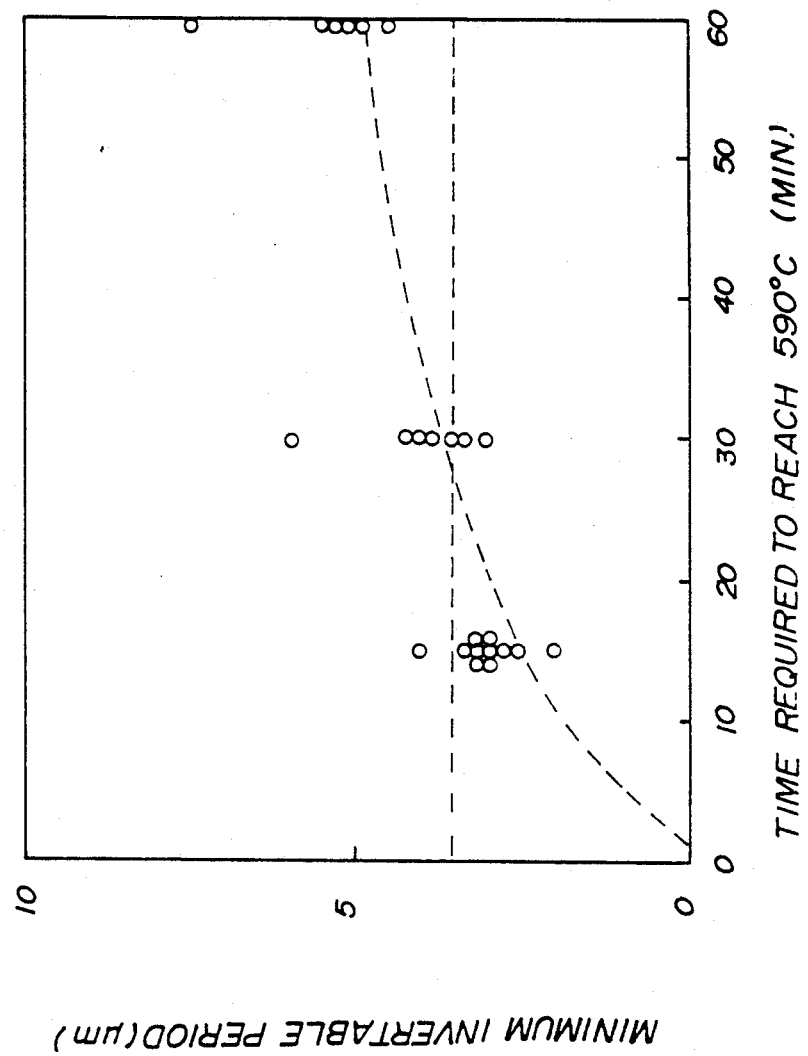
FIG. 13 is a diagram for explaining a relationship between a temperature raising time and a minimum domain invertable period.

FIG. 13 shows the minimum invertable period of the domain with respect to the temperature raising time. FIG. 13 shows the case where the temperature is raised to 590° C. It may be seen from FIG. 13 that the minimum invertable period of the domain for enabling stable inversion becomes larger as the temperature raising time becomes longer. When forming the waveguide type SHG element with the first order quasi phase matching, it is seen from FIG. 13 that the temperature raising time should be within 30 minutes, and preferably within 15 minutes, when the period of the domain inversion regions is 3.5 μm or less.

Figure 14:
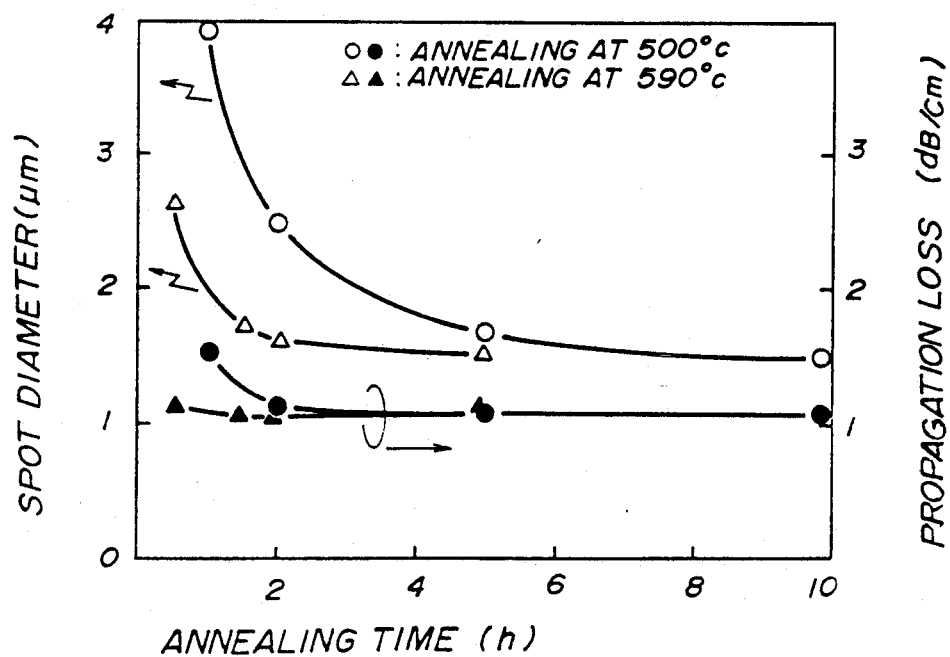
FIG. 14 is a diagram for explaining a relationship between a spot diameter and an annealing time.

FIG. 14 shows the relationship of the annealing time of the annealing process carried out in the process described above in conjunction with FIG. 4F, for example, and the spot diameter and the propagation loss of the optical waveguide which is formed after the annealing process.

As may be seen from FIG. 14, it is possible to form an optical waveguide which has a small spot diameter (that is, satisfactory confinement characteristic) and a low propagation loss by carrying out the annealing process. The change in the spot diameter can be explained by the increase in the refractive index in the vicinity of the substrate surface in correspondence with the proton concentration. In other words, in a case where the refractive index of the substrate is higher than its original value due to insufficient annealing, the change in the refractive index is small even if the proton exchange is newly made to form the optical waveguide.

Therefore, in order to reduce the propagation loss of the optical waveguide and set the spot diameter to 2 to 3 μm so as to increase the mutual effect relative to the domain inversion regions, it may be regarded desirable that the annealing process is carried out for 2 hours or more at 500° C., and preferably for 5 hours or more. At 590° C., it may be regarded desirable that the annealing process is carried out for 30 minutes or more, and preferably for 90 minutes or more.

It should be noted that, in addition to the effects described above, the annealing process has the effect of preventing deterioration of the nonlinear optical coefficient caused by the high concentration proton.

In the embodiments described above, the substrate 1 is made of LiTaO$_3$, the Ta layer is used as the proton (H+) exchange blocking layers 200 and 200A, and pyrophosphoric acid is used as the proton (H+) exchange fluid 5. However, the materials used for the substrate 1 and the proton (H+) exchange blocking layers 200 and 200A and the fluid used for the proton (H+) exchange fluid 5 are not limited to those of the described embodiments, and other materials and fluids may be used. For example, benzoic acid may be used as the proton (H+) exchange fluid 5. In addition, techniques other than those employed in the described embodiments may be used to realize the method of the present invention and the waveguide type SHG element according to the present invention.

Further, the present invention is not limited to these embodiments, but various variations and modifications may be made without departing from the scope of the present invention.

What is claimed is:

1. A waveguide type second-harmonic generation element comprising:
   a substrate made of LiTaO$_3$ and having a top surface;
   a plurality of domain inversion regions formed on the top surface of said substrate and extending in a first direction approximately parallel to each other, said domain inversion regions having a first depth into said substrate;
   a plurality of domain non-inversion regions formed on the top surface of said substrate and extending in the first direction approximately parallel to each other, said domain inversion region and said domain non-inversion regions alternately occurring on said substrate; and an optical waveguide formed on the top surface of said substrate and traversing said domain inversion regions and said domain non-inversion regions, said optical waveguide having a second depth and extending in a second direction which is approximately perpendicular to the first direction and wherein said domain inversion regions have a uniform refractive index distribution.

2. The waveguide type second-harmonic generation element as claimed in claim 1, wherein said domain inversion regions have an approximate semi-circular shape in a cross section taken along a plane parallel to the second direction and perpendicular to the top surface of said substrate.

3. The waveguide type second-harmonic generation element as claimed in claim 1, wherein said domain inversion regions have a first width $l_2$ in the second direction at the top surface of said substrate, said domain non-inversion regions have a second width $l_1$ in the second direction at the top surface of said substrate, and a ratio $l_2:l_1 = 2n-1:1$ when a period of said domain inversion regions in the second direction is n times a minimum period of domain inversion required for a quasi phase matching of a second harmonics generated in said optical waveguide, wherein n is an integer.

4. The waveguide type second-harmonic generation element as claimed in claim 3, wherein $n=2$.

5. The waveguide type second-harmonic generation element as claimed in claim 1, wherein the top surface of said substrate is an optically polished -Z face.

6. The waveguide type second-harmonic generation element as claimed in claim 1, wherein the second depth of said optical waveguide is smaller than the first depth of said domain inversion regions.

7. A method of producing a waveguide type second-harmonic generation element, said method comprising the steps of:

(a) forming periodic proton ($H^+$) exchange blocking layers on a top surface of a substrate which is made of $LiTaO_3$, said proton ($H^+$) exchange blocking layers being approximately parallel and extending in a first direction which is approximately perpendicular to a second direction in which the proton ($H^+$) exchange blocking layers are periodically arranged;

(b) forming proton exchange layers on the top surface of the substrate not covered by the proton ($H^+$) exchange blocking layers;

(c) forming periodic domain inversion regions by heating the substrate to a predetermined temperature immediately below a Curie point and inverting domain of the proton ($H^+$) exchange layers;

(d) diffusing the proton ($H^+$) by subjecting the substrate to an annealing process; and (e) forming an optical waveguide on the top surface of the substrate so as to traverse the domain inversion regions, said optical waveguide extending in the second direction.

8. The method as claimed in claim 7, wherein said steps (c) and (d) form the domain inversion regions having a first depth into said substrate, and said step (e) forms the optical waveguide having a second depth which is smaller than the first depth.

9. The method as claimed in claim 7, wherein said steps (c) and (d) form the domain inversion regions having an approximate semi-circular shape in a cross section taken along a plane parallel to the second direction and perpendicular to the top surface of the substrate.

10. The method as claimed in claim 7, wherein said steps (c) and (d) form the domain inversion regions having a first width $l_2$ in the second direction at the top surface of the substrate and domain non-inversion regions having a second width $l_1$ in the second direction at the top surface of the substrate so that a ratio $l_2:l_1 = 2n-1:1$ when a period of the domain inversion regions in the second direction is n times a minimum period of domain inversion required for a quasi phase matching of second harmonics generated in the optical waveguide, said domain inversion regions and said domain non-inversion regions alternately occurring on the substrate in the second direction, wherein n is an integer.

11. The method as claimed in claim 10, wherein $n=2$.

12. The method as claimed in claim 7, wherein said step (a) forms the periodic proton ($H^+$) exchange blocking layers on an optically polished -Z face of the substrate.

13. The method as claimed in claim 7, wherein said step (c) heats the substrate to the predetermined temperature within approximately 30 minutes.

14. The method as claimed in claim 13, wherein said step (c) heats the substrate to the predetermined temperature which is in a range of approximately 590° to 595° C.

15. The method as claimed in claim 7, wherein said step (d) carries out the annealing process at a temperature which is lower than the predetermined temperature.

16. The method as claimed in claim 7, wherein said step (d) carries out the annealing process at a temperature of approximately 500° C. for at least approximately 2 hours.

* * * * *